United States Patent
Hosotani

(10) Patent No.: US 12,368,382 B2
(45) Date of Patent: Jul. 22, 2025

(54) POWER SUPPLY SYSTEM APPARATUS

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 254 days.

(21) Appl. No.: 18/353,369

(22) Filed: Jul. 17, 2023

(65) Prior Publication Data

US 2023/0361683 A1    Nov. 9, 2023

Related U.S. Application Data

(63) Continuation of application No. PCT/JP2022/001132, filed on Jan. 14, 2022.

(30) Foreign Application Priority Data

Jan. 19, 2021 (JP) ................................ 2021-006166

(51) Int. Cl.
*H02M 3/158* (2006.01)
*H02M 1/00* (2006.01)

(52) U.S. Cl.
CPC ....... *H02M 3/1586* (2021.05); *H02M 1/0009* (2021.05); *H02M 1/0025* (2021.05)

(58) Field of Classification Search
CPC . H02M 3/1586; H02M 1/0009; H02M 1/0025
(Continued)

(56) References Cited

U.S. PATENT DOCUMENTS

| | | | | |
|---|---|---|---|---|
| 6,574,124 | B2 * | 6/2003 | Lin | .................... H02M 3/33569 363/72 |
| 2004/0169499 | A1 * | 9/2004 | Huang | ................ H02M 3/1584 323/272 |
| 2012/0169311 | A1 * | 7/2012 | Malmberg | .............. H02J 1/102 323/272 |

FOREIGN PATENT DOCUMENTS

| JP | 2006-050891 A | 2/2006 |
|---|---|---|
| JP | 2012-090423 A | 5/2012 |

(Continued)

OTHER PUBLICATIONS

International Search Report issued in PCT/JP2022/001132; mailed Mar. 8, 2022.

*Primary Examiner* — Yemane Mehari
(74) *Attorney, Agent, or Firm* — Studebaker Brackett PLLC

(57) ABSTRACT

A power supply system apparatus includes a plurality of power conversion circuits and an MPU. The MPU outputs oscillation control signals to the plurality of power conversion circuits. Each of the plurality of power conversion circuits includes a pulse width modulation control circuit formed of an analog electronic circuit. For example, the power conversion circuit drives switching elements on the basis of a feedback signal obtained by detecting an output voltage of a common output terminal. An integrated system controller including the MPU and the plurality of power conversion circuits includes a plurality of individual voltage feedback control loops for individually controlling the plurality of power conversion circuits on the basis of feedback signals and supplies power to a load, while the plurality of power conversion circuits performing driving control using the individual voltage feedback control loops at the same time.

20 Claims, 6 Drawing Sheets

(58) Field of Classification Search
USPC .......................................................... 323/272
See application file for complete search history.

(56) References Cited

FOREIGN PATENT DOCUMENTS

| | | |
|---|---|---|
| JP | 2012-151937 A | 8/2012 |
| WO | 2015/050094 A1 | 4/2015 |
| WO | 2020/183820 A1 | 9/2020 |

\* cited by examiner

POWER SUPPLY SYSTEM APPARATUS

CROSS-REFERENCE TO RELATED APPLICATIONS

This application claims benefit of priority to International Patent Application No. PCT/JP2022/001132, filed Jan. 14, 2022, and to Japanese Patent Application No. 2021-006166, filed Jan. 19, 2021, the entire contents of each are incorporated herein by reference.

BACKGROUND

Technical Field

The present disclosure relates to a power supply system apparatus including a plurality of power conversion circuits.

Background Art

In International Publication No. 2020/183820, a system power supply system apparatus is described. The system power supply system apparatus in International Publication No. 2020/183820 includes a plurality of power conversion circuits and a common controller. The plurality of power conversion circuits each include an inductor, a switching circuit, and an individual analog controller.

The individual analog controller includes a feedback signal generation part that detects the output state of the power conversion circuit and generates a feedback signal and a driving part that controls driving of the switching circuit in accordance with the feedback signal.

The common controller includes a digital electronic circuit that is capable of performing programmable arithmetic processing. The common controller outputs an oscillation control signal corresponding to an output voltage to the driving part of the individual analog controller.

The driving part of the individual analog controller controls driving of a switching element in the switching circuit in accordance with the oscillation control signal.

SUMMARY

However, with the configuration illustrated in International Publication No. 2020/183820, it is difficult to quickly respond to a rapid change in a load (output voltage) and provide a stable output.

Accordingly, the present disclosure provides a power supply system apparatus capable of providing a quick response to a rapid change in a load (output voltage) and implementing a stable power supply.

A power supply system apparatus according to the present disclosure includes a plurality of power conversion circuits, a common input terminal, a common output terminal, and a common controller. Each of the plurality of power conversion circuits includes an inductor, a switching circuit, and an individual analog controller. Input parts of the plurality of power conversion circuits are connected in parallel to the common input terminal, and the common input terminal is connected to an input power supply. Output parts of the plurality of power conversion circuits are connected in parallel to the common output terminal, and the common output terminal is connected to a load. The common controller outputs oscillation control signals to the plurality of power conversion circuits.

The individual analog controller includes a pulse width modulation control circuit formed of an analog electronic circuit. The individual analog controller includes a voltage feedback signal generation part and a driving part. The voltage feedback signal generation part detects an output voltage of the common output terminal and generates a feedback signal. The driving part drives, based on the feedback signal, a switching element of the switching circuit.

An integrated system controller includes the common controller and the plurality of individual analog controllers. The integrated system controller includes a plurality of individual voltage feedback control loops for individually controlling, based on the feedback signals, the pulse width modulation control circuits, while the plurality of power conversion circuits operating in conjunction with each other. The integrated system controller supplies power to the load, while the plurality of power conversion circuits performing driving control using the individual voltage feedback control loops at the same time in a voltage conversion operation for converting a voltage of the input power supply.

With this arrangement, a change in the load (output voltage) is fed back by the individual voltage feedback control loops each including the analog circuit, and pulse width modulation control is performed by the driving part and the switching element configuring the individual voltage feedback control loop in such a manner that the change in the load (output voltage) is compensated for. Thus, a quick response can be achieved. Furthermore, a plurality of individual voltage feedback loops including power conversion circuits perform driving control at the same time. Thus, multi-phase control can be implemented, while a quick response to a change in the load described above being provided, and a stable output can be achieved.

According to the present disclosure, a change in the output voltage can be detected by a plurality of power conversion circuits at the same time, driving control using a voltage feedback control loop that can respond most quickly to the detected change in the output voltage can be performed, a quick response to a rapid change in a load can be provided, and a stable power supply can be implemented.

DETAILED DESCRIPTION

First Embodiment

Figure 1:
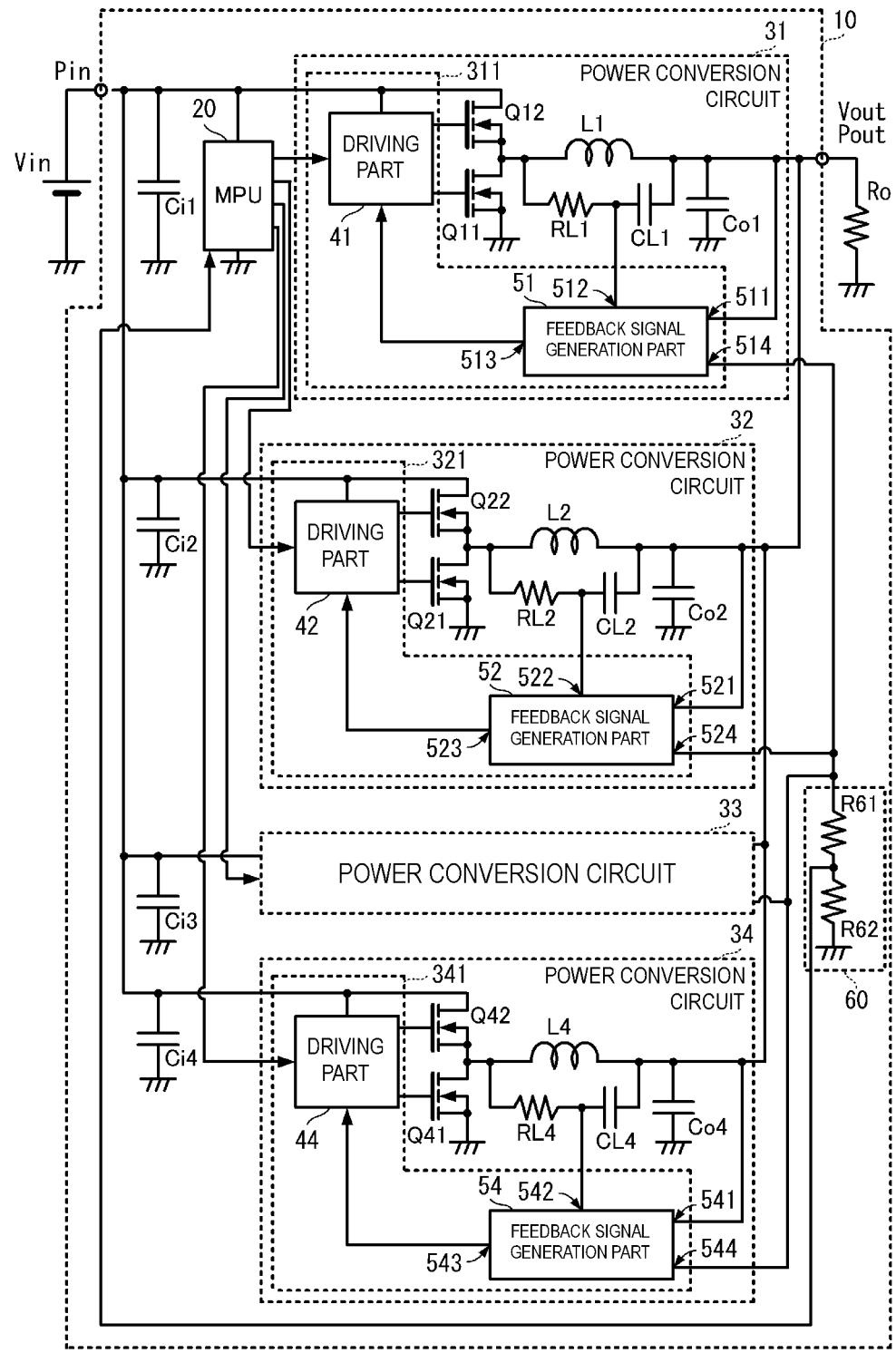
FIG. 1 is a circuit block diagram illustrating an example of a power supply system apparatus according to a first embodiment.

A power supply system apparatus according to a first embodiment of the present disclosure will be described with reference to drawings. FIG. 1 is a circuit block diagram illustrating an example of the power supply system apparatus according to the first embodiment.

(Schematic Configuration of Entire Power Supply System Apparatus 10)

As illustrated in FIG. 1, the power supply system apparatus 10 includes an MPU 20, a power conversion circuit 31, a power conversion circuit 32, a power conversion circuit 33, a power conversion circuit 34, and a voltage-dividing circuit 60. In this embodiment, the number of power conversion circuits is four. However, the configuration of this embodiment can be applied to the case where the number of power conversion circuits is two or more. A power supply system apparatus means, for example, a power supply apparatus that includes a plurality of power conversion circuits and properly controls the number of power conversion circuits to operate and the operating states of the power conversion circuits in accordance with the state of a load, unlike a power supply apparatus including only one power conversion circuit.

The power supply system apparatus 10 includes a common input terminal Pin and a common output terminal Pout. The common input terminal Pin is connected to an external DC voltage source (input power supply). The power supply system apparatus 10 receives supply of a DC input voltage Vin through the common input terminal Pin. The common output terminal Pout is connected to a load Ro. The voltage of the common output terminal Pout serves as an output voltage Vout of the power supply system apparatus 10.

(Overview of Control by MPU 20 and Multi-Phase Control)

The MPU 20 is connected to the common input terminal Pin, and power is supplied through the common input terminal Pin to the MPU 20. This power supply line is connected to a ground reference potential through an input capacitor Ci1.

The MPU 20 is a digital electronic circuit and is a programmable MicroProcessing Unit. The MPU 20 is a device capable of performing programmable arithmetic processing. The MPU 20 generates, by the programmable arithmetic processing, control signals (oscillation control signals) for driving parts 41 to 44 of the plurality of power conversion circuits 31 to 34. The MPU 20 corresponds to a "common controller" according to the present disclosure.

The MPU 20 is connected to the power conversion circuit 31, the power conversion circuit 32, the power conversion circuit 33, and the power conversion circuit 34. The MPU 20 outputs control signals to the power conversion circuit 31, the power conversion circuit 32, the power conversion circuit 33, and the power conversion circuit 34.

For example, the MPU 20 outputs to a power conversion circuit that is to operate (a power conversion circuit enabled to operate), out of the plurality of power conversion circuits, a control signal corresponding to the power conversion circuit, whereas does not output to a power conversion circuit that is not to operate (a power conversion circuit disabled to operate) a control signal. At this time, the MPU 20 determines the number of power conversion circuits to operate, on the basis of voltages obtained by dividing a common bus signal (details will be described later) based on the output voltage Vout by the voltage-dividing circuit 60, which includes resistors R61 and R62.

A control signal output to a power conversion circuit to operate includes an oscillation signal having a switching frequency of the corresponding power conversion circuit. The oscillation signals of the control signals have a phase difference, and the phase difference is set according to the number of power conversion circuits that are to operate.

Thus, the MPU 20 causes the power supply system apparatus 10 to operate as a multi-phase converter.

Figure 2A:
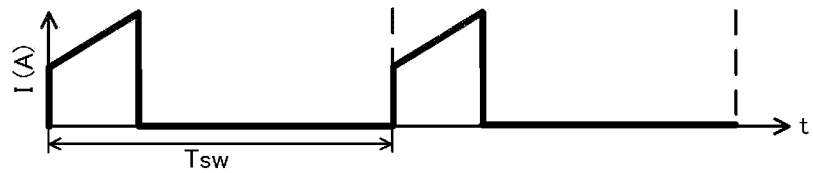
FIGS. 2A, 2B, 2C, and 2D are diagrams illustrating examples of waveforms at the time of multi-phase control in the case where there are two power conversion circuits.
Figure 2B:
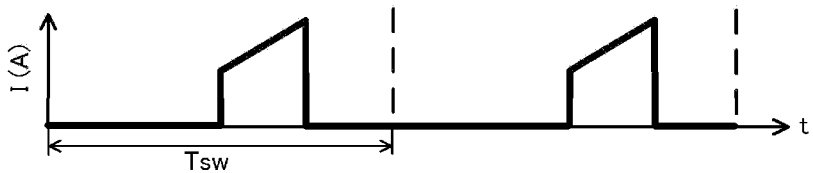
Figure 2C:
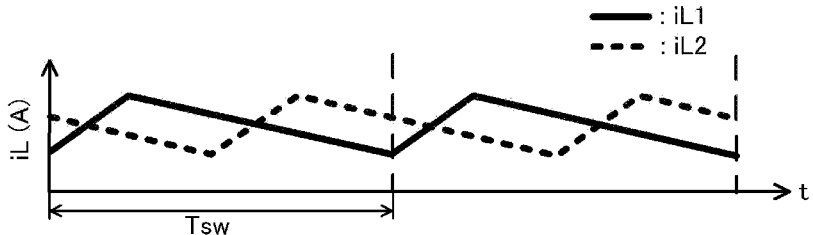
Figure 2D:
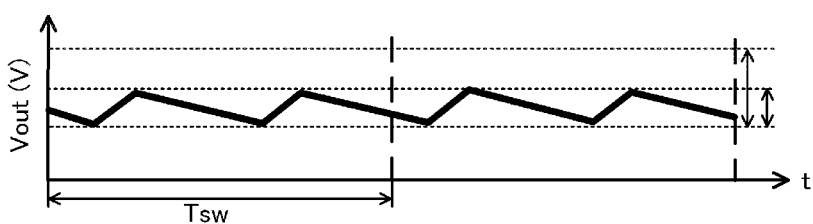

FIGS. 2A, 2B, 2C, and 2D are diagrams illustrating examples of waveforms at the time of multi-phase control in the case where there are two power conversion circuits. FIGS. 2A and 2B illustrate input currents of power conversion circuits, FIG. 2C illustrates inductor currents in power conversion circuits, and FIG. 2D illustrates output voltage. FIGS. 2A, 2B, 2C, and 2D illustrate examples of the case where there are two power conversion circuits and the two power conversion circuits operate as in this embodiment. Hereinafter, the case where the power conversion circuit 31 and the power conversion circuit 32 are used as the two power conversion circuits will be described.

The MPU 20 outputs to the power conversion circuit 31 and the power conversion circuit 32 control signals whose phases are shifted in accordance with a switching period Tsw. Thus, input currents are generated in the power conversion circuit 31 and the power conversion circuit 32, as illustrated in FIGS. 2A and 2B. The power conversion circuit 31 generates an inductor current iL1 as indicated by a solid line in FIG. 2C in accordance with the input current, and outputs an individual output voltage Vout1 according to the inductor current iL1. Furthermore, the power conversion circuit 32 generates an inductor current iL2 as indicated by a broken line in FIG. 2C in accordance with the input current, and outputs an individual output voltage Vout2 according to the inductor current iL2.

The output voltage Vout output to the common output terminal Pout is a voltage obtained by combining the individual output voltage Vout1 of the power conversion circuit 31 and the individual output voltage Vout2 of the power conversion circuit 32. Thus, the output voltage Vout exhibits a waveform as illustrated in FIG. 2D.

Due to multi-phase control of the power conversion circuit 31 and the power conversion circuit 32, a voltage change in the individual output voltage Vout1 of the power conversion circuit 31 and a voltage change in the individual output voltage Vout2 of the power conversion circuit 32 cancel each other out, and the ripple voltage decreases. That is, the ripple voltage is smaller than the case where the power conversion circuit 31 or the power conversion circuit 32 is solely used.

Thus, the power supply system apparatus 10 can stabilize the output voltage Vout.

(Configurations of Power Conversion Circuits 31 to 34)

The power conversion circuits 31 to 34 are connected to the common input terminal Pin, and power is supplied through the common input terminal Pin to the power conversion circuits 31 to 34. A power supply line for the power conversion circuit 31 is connected to the ground reference potential through the input capacitor Ci1. A power supply line for the power conversion circuit 32 is connected to the ground reference potential through the input capacitor Ci2. A power supply line for the power conversion circuit 33 is connected to the ground reference potential through the input capacitor Ci3. A power supply line for the power conversion circuit 34 is connected to the ground reference potential through the input capacitor Ci4.

An output end of the power conversion circuit 31, an output end of the power conversion circuit 32, an output end of the power conversion circuit 33, and an output end of the power conversion circuit 34 are connected to the common output terminal Pout.

The plurality of power conversion circuits 31 to 34 individually perform, at the same time, a voltage conversion operation for converting the input voltage Vin into the output voltage Vout. The power conversion circuits 31 to 34 have the same circuit configurations.

As illustrated in FIG. 1, the power conversion circuit 31 includes the driving part 41, a switching element Q11, a switching element Q12, an inductor L1, an output capacitor Co1, a resistor RL1, a capacitor CL1, and a feedback signal generation part 51. The feedback signal generation part 51 includes a terminal 511, a terminal 512, a terminal 513, and a terminal 514. The terminal 511, the terminal 512, the terminal 513, and the terminal 514 may have physical terminal structures. In terms of function, however, the terminal 511, the terminal 512, the terminal 513, and the terminal 514 are connection parts to other circuit elements or the like. A circuit including the switching element Q11 and the switching element Q12 corresponds to a "switching circuit" according to the present disclosure.

The power conversion circuit 32 includes the driving part 42, a switching element Q21, a switching element Q22, an inductor L2, an output capacitor Co2, a resistor RL2, a capacitor CL2, and a feedback signal generation part 52. The feedback signal generation part 52 includes a terminal 521, a terminal 522, a terminal 523, and a terminal 524. The terminal 521, the terminal 522, the terminal 523, and the terminal 524 may have physical terminal structures. In terms of function, however, the terminal 521, the terminal 522, the terminal 523, and the terminal 524 are connection parts to other circuit elements or the like. A circuit including the switching element Q21 and the switching element Q22 corresponds to a "switching circuit" according to the present disclosure.

The power conversion circuit 34 includes the driving part 44, a switching element Q41, a switching element Q42, an inductor L4, an output capacitor Co4, a resistor RL4, a capacitor CL4, and a feedback signal generation part 54. The feedback signal generation part 54 includes a terminal 541, a terminal 542, a terminal 543, and a terminal 544. The terminal 541, the terminal 542, the terminal 543, and the terminal 544 may have physical terminal structures. In terms of function, however, the terminal 541, the terminal 542, the terminal 543, and the terminal 544 are connection parts to other circuit elements or the like. A circuit including the switching element Q41 and the switching element Q42 corresponds to a "switching circuit" according to the present disclosure.

Although illustration is omitted, like the power conversion circuits 31, 32, and 34, the power conversion circuit 33 includes the driving part 43, a switching element Q31, a switching element Q32, an inductor L3, an output capacitor Co3, a resistor RL3, a capacitor CL3, and a feedback signal generation part 53. The feedback signal generation part 53 includes a terminal 531, a terminal 532, a terminal 533, and a terminal 534. The terminal 531, the terminal 532, the terminal 533, and the terminal 534 may have physical terminal structures. In terms of function, however, the terminal 531, the terminal 532, the terminal 533, and the terminal 534 are connection parts to other circuit elements or the like. A circuit including the switching element Q31 and the switching element Q32 corresponds to a "switching circuit" according to the present disclosure.

Figure 3:
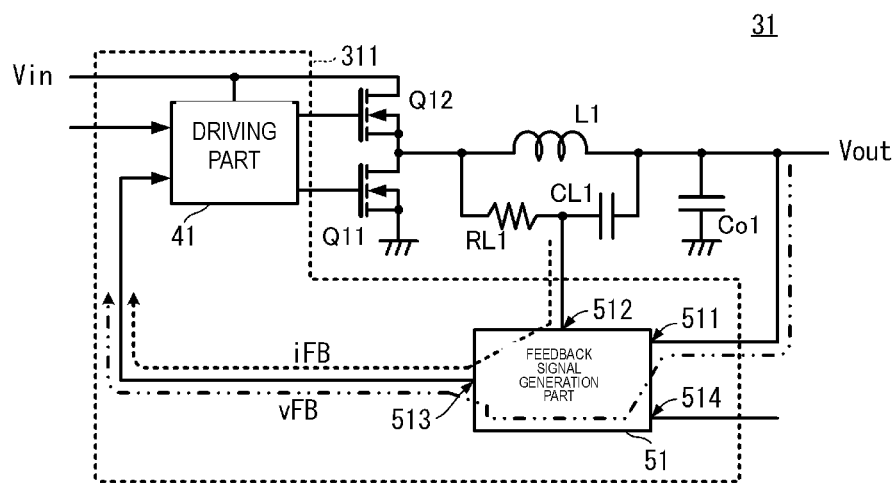
FIG. 3 is a circuit block diagram illustrating an example of a specific circuit configuration of a power conversion circuit.

Since the plurality of power conversion circuits 31 to 34 have the same circuit configurations, only the circuit configuration of the power conversion circuit 31 will be specifically described below. FIG. 3 is a circuit block diagram illustrating an example of a specific circuit configuration of a power conversion circuit.

The driving part 41 is connected to the common input terminal Pin, and power is supplied through the common input terminal Pin to the driving part 41. The driving part 41 is formed of an analog circuit. Furthermore, the driving part 41 and the feedback signal generation part 51 form an individual analog controller. The individual analog controller and the switching circuit configure, for example, a PWM control IC including integrated FETs.

A control signal from the MPU 20 is input to the driving part 41. A feedback signal obtained by combining a voltage feedback signal and a current feedback signal from the feedback signal generation part 51 is input to the driving part 41. That is, an individual voltage feedback signal is fed back to the driving part 41 through an individual voltage feedback control loop vFB as indicated by a two-dot chain line in FIG. 3, and an individual current feedback signal is fed back to the driving part 41 through an individual current feedback control loop iFB as indicated by a dotted line in FIG. 3. Explanation of the individual voltage feedback control loop vFB and the individual current feedback control loop iFB will be provided later in description of the feedback signal generation part 51.

The driving part 41 generates, for each of the switching element Q11 and the switching element Q12, a switching control signal based on PWM (pulse width modulation) control from a control signal and a feedback signal.

Figure 4:
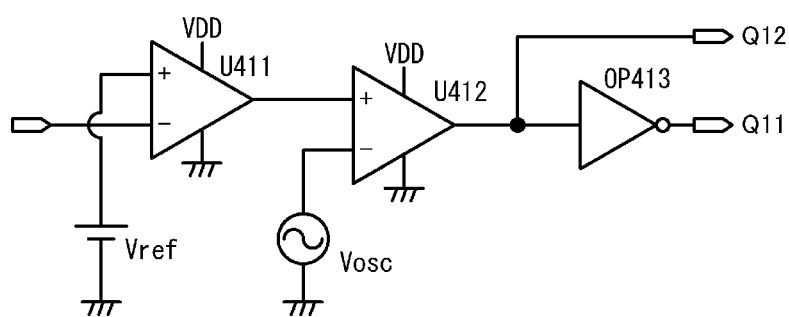
FIG. 4 is an equivalent circuit diagram illustrating an example of the circuit configuration of a driving part.

Specifically, the driving part 41 has, for example, a circuit configuration illustrated in FIG. 4. FIG. 4 is an equivalent circuit diagram illustrating an example of the circuit configuration of a driving part. As illustrated in FIG. 4, the driving part 41 includes an error amplifier U411, a PWM comparator U412, and an inverter OP413.

A feedback signal is input to an inverting input terminal of the error amplifier U411. A reference voltage Vref is applied to a non-inverting input terminal of the error amplifier U411. The reference voltage Vref is set based on the output voltage Vout for allowing a stable operation of the load.

An output terminal of the error amplifier U411 is connected to a non-inverting input terminal of the PWM comparator U412. A frequency signal for PWM control (a voltage signal of a predetermined frequency) is input to an inverting input terminal of the PWM comparator U412.

An output terminal of the PWM comparator U412 is connected to the switching element Q12 and is connected to the switching element Q11 with the inverter OP413 interposed therebetween.

With this arrangement, the driving part 41 generates a PWM control signal on the basis of the voltage of a feedback signal and outputs the generated PWM control signal to the switching element Q11 and the switching element Q12. Since the driving part 41 includes an analog electronic circuit, the driving part 41 is capable of quickly outputting a PWM control signal corresponding to the voltage of the feedback signal. Specific operational effects achieved by the use of such a feedback signal to the output voltage Vout and the inductor current iL1 will be described together after the description of the feedback signal generation part 51.

The gate of the switching element Q12 is connected to the driving part 41, the drain of the switching element Q12 is connected to the common input terminal Pin, and the source of the switching element Q12 is connected to the drain of the switching element Q11. The gate of the switching element Q11 is connected to the driving part 41, and the source of the switching element Q11 is connected to the ground reference potential.

A PWM control signal for the switching element Q12 from the driving part 41 is input to the gate of the switching element Q12. A switching control signal for the switching element Q11 from the driving part 41 is input to the gate of the switching element Q11.

One end of the inductor L1 is connected to a connection point between the source of the switching element Q12 and the drain of the switching element Q11.

The other end of the inductor L1 is connected to the common output terminal Pout. The other end of the inductor L1 is connected to the ground reference potential with the output capacitor Co1 interposed therebetween.

A series circuit including the resistor RL1 and the capacitor CL1 is connected in parallel to the inductor L1. This circuit corresponds to an "inductor current detection circuit" according to the present disclosure. The resistor RL1 corresponds to a "detecting resistor" according to the present disclosure, and the capacitor CL1 corresponds to a "detecting capacitor" according to the present disclosure. A connection point between the resistor RL1 and the capacitor CL1 is connected to the terminal 512 of the feedback signal generation part 51. That is, the inductor current detection circuit for the inductor L1 is capable of outputting the voltage across the capacitor CL1 as a detection signal of an inductor current iL1 of the inductor L1 to the feedback signal generation part 51.

At this time, by setting the inductance of the inductor L1, the resistance of an equivalent series resistor Rs1 of the inductor L1, the resistance of the resistor RL1, and the capacitance of the capacitor CL1 to have a specific relationship, the inductor current detection circuit is capable of detecting, without any loss, the inductor current iL1 flowing in the inductor L1.

Specifically, the relationship of $Rs1/L1=1/(CL1 \cdot R1L)$ is used. That is, the capacitance of the capacitor CL1 and the resistance of the resistor RL1 (a time constant of a CR circuit including the capacitor CL1 and the resistor RL1 (CR time constant)) are set to satisfy the above-mentioned equation with respect to the inductance of the inductor L1 and the resistance of the equivalent series resistor Rs1 of the inductor L1. Accordingly, an inductor current $iL1(t)$ that varies with time can be detected without any loss.

(Configuration of Feedback Signal Generation Part 51)

As illustrated in FIGS. 1 and 3, the feedback signal generation part 51 includes the terminal 511, the terminal 512, the terminal 513, and the terminal 514. The terminal 511 is connected to the common output terminal Pout, in other words, a parallel connection part for an output end of the power conversion circuit 31 and an output end of the power conversion circuit 32. The terminal 512 is connected to the connection point between the resistor RL1 and the capacitor CL1. The terminal 513 is connected to the driving part 41.

The terminal 514 is connected in parallel to a terminal 524 of the feedback signal generation part 52 in the other power conversion circuit 32. That is, the terminal 514 of the feedback signal generation part 51 in the power conversion circuit 31 and the terminal 524 of the feedback signal generation part 52 in the power conversion circuit 32 are connected to a common node. The common node is connected to the MPU 20 with the voltage-dividing circuit 60 interposed therebetween, as described above.

The feedback signal generation part 51 includes an analog circuit. The feedback signal generation part 51 generates a feedback signal for the driving part 41 on the basis of the output voltage Vout, the inductor current iL1 of the inductor L1, and the voltage of the common node (voltage of a common bus signal).

Figure 5:
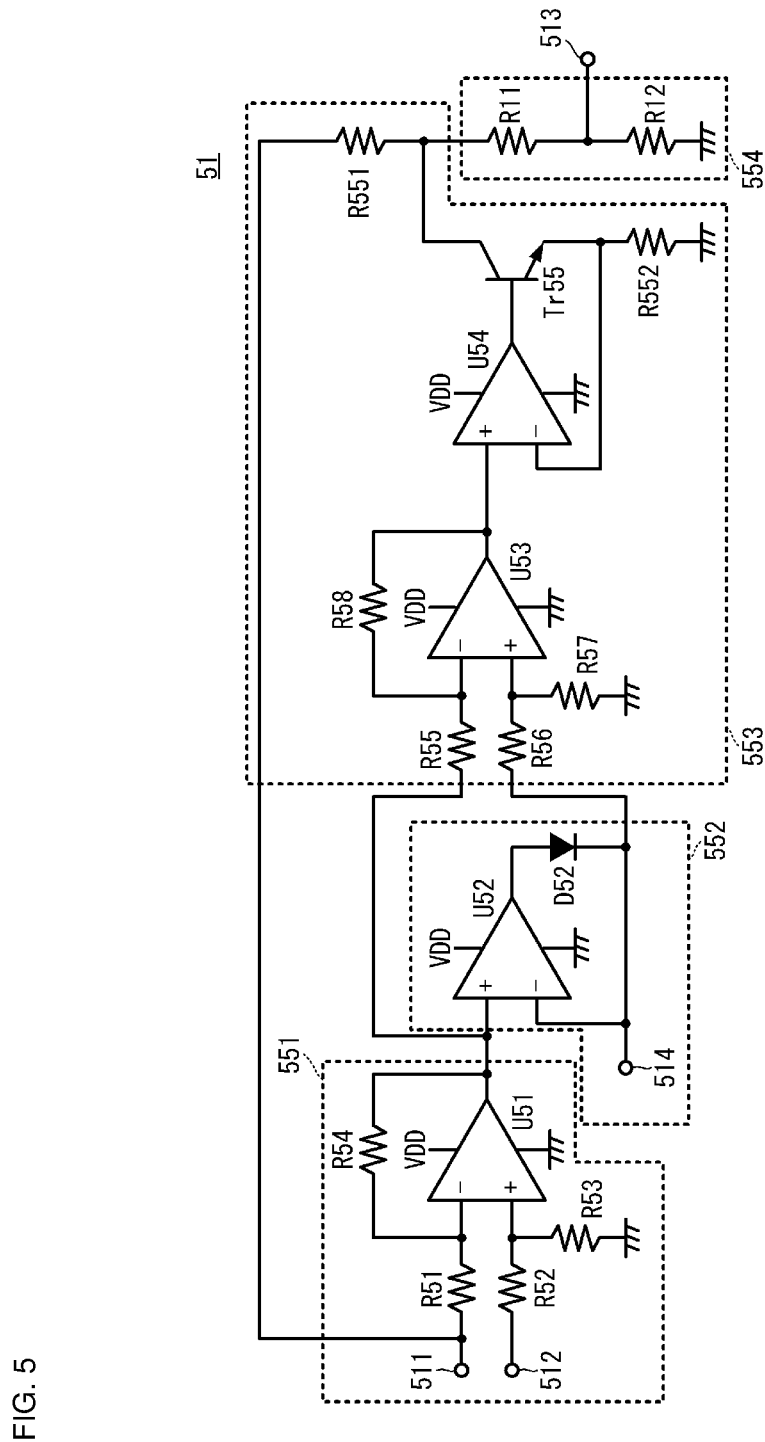
FIG. 5 is an equivalent circuit diagram illustrating an example of a feedback signal generation part according to the first embodiment.

FIG. 5 is an equivalent circuit diagram illustrating an example of a feedback signal generation part according to the first embodiment.

The feedback signal generation part 51 includes an individual current signal generator 551, a common signal generator 552, an individual feedback signal generator 553, and a voltage adjustment circuit 554.

The individual current signal generator 551 includes an amplifier U51, a resistor R51, a resistor R52, a resistor R53, and a resistor R54.

An inverting input terminal of the amplifier U51 is connected the terminal 511 with the resistor R51 interposed therebetween. A non-inverting input terminal of the amplifier U51 is connected to the terminal 512 with the resistor R52 interposed therebetween. The resistance of the resistor R51 and the resistance of the resistor R52 are the same. The resistor R53 is connected between the non-inverting input terminal and the ground reference potential. An output terminal of the amplifier U51 is connected to the inverting input terminal of the amplifier U51 with the resistor R54 interposed therebetween. The resistance of the resistor R53 and the resistance of the resistor R54 are the same. Driving power VDD is supplied to the amplifier U51. With this circuit arrangement, the individual current signal generator 551 implements a differential amplifier circuit.

The terminal 511 is connected to the common output terminal Pout, and the terminal 512 is connected to the connection point between the capacitor CL1 and the resistor RL1. Accordingly, there is a potential difference corresponding to the inductor current iL1 between the non-inverting input terminal and the inverting input terminal of the amplifier U51. A signal based on the inductor current iL1 is amplified at a predetermined amplification rate and output as an individual current signal from the output terminal of the amplifier U51, that is, an output terminal of the individual current signal generator 551.

The common signal generator 552 includes an amplifier U52 and a diode D52. A non-inverting input terminal of the amplifier U52 is connected to the output terminal of the amplifier U51. An output terminal of the amplifier U52 is connected to an inverting input terminal of the amplifier U52 with the diode D52 interposed therebetween. The anode of the diode D52 is connected to the output terminal, and the cathode of the diode D52 is connected to the inverting input terminal. The inverting input terminal is connected to the terminal 514, that is, the common node. The driving power VDD is supplied to the amplifier U52.

With this circuit arrangement, the common signal generator 552 implements a maximum value holding circuit for individual current signals for the plurality of power conversion circuits 31 and 32. A signal indicating the maximum value of the individual current signals corresponds to a "common bus signal" in the present disclosure.

The individual feedback signal generator 553 includes an amplifier U53, an amplifier U54, a transistor Tr55, a resistor R55, a resistor R56, a resistor R57, a resistor R58, a resistor R551, and a resistor R552.

An inverting input terminal of the amplifier U53 is connected to the output terminal of the amplifier U51 with the resistor R55 interposed therebetween. A non-inverting input terminal of the amplifier U53 is connected to the cathode of the diode D52 and a terminal 514 with the resistor R56 interposed therebetween. The resistance of the resistor R55 and the resistance of the resistor R56 are the same. The resistor R57 is connected between the non-inverting input terminal of the amplifier U53 and the ground reference potential. An output terminal of the amplifier U53 is connected to the inverting input terminal of the amplifier U53 with the resistor R58 interposed therebetween. The resistance of the resistor R57 and the resistance of the resistor R58 are the same. The driving power VDD is supplied to the amplifier U53.

A non-inverting input terminal of the amplifier U54 is connected to the output terminal of the amplifier U53. An output terminal of the amplifier U54 is connected to the base of the transistor Tr55 of an NPN type. The collector of the transistor Tr55 is connected to the terminal 511 with the resistor R551 interposed therebetween. The emitter of the transistor Tr55 is connected to the ground reference potential with the resistor R552 interposed therebetween. The emitter of the transistor Tr55 is connected to an inverting input terminal of the amplifier U54.

An individual current signal is input to the inverting input terminal of the amplifier U53, and a common bus signal is input to the non-inverting input terminal of the amplifier U53. Accordingly, a potential difference between the common bus signal and the individual current signal occurs between the non-inverting input terminal and the inverting input terminal of the amplifier U53. A signal based on the potential difference between the common bus signal and the individual current signal is amplified at a predetermined amplification rate and output from the output terminal of the amplifier U53 to the amplifier U54.

A voltage-current conversion circuit is implemented by a circuit including the amplifier U54, the transistor Tr55, and the resistor R552. Specifically, in this circuit, when a differential signal (differential voltage) is applied to the non-inverting input terminal of the amplifier U54, a differential signal (differential current Iadj) flows between the collector and emitter of the transistor Tr55. This differential current corresponds to an individual current feedback signal.

Due to flowing of the differential current Iadj, the voltage of the connection point between the resistor R551 and the resistor R11 (collector of the transistor Tr55) is expressed by Vout−(Rr551×Iadj), where Rr551 represents the resistance of the resistor R551.

The output voltage Vout is the same as the individual voltage feedback signal. Thus, the individual feedback signal generator 553 is capable of generating and outputting a feedback signal obtained by combining an individual current feedback signal and an individual voltage feedback signal.

The voltage adjustment circuit 554 is a so-called voltage-dividing circuit and includes a series circuit including a resistor R11 and a resistor R12. The resistor R11 is connected to a connection point between the collector of the transistor Tr55 and the resistor R551 in the individual feedback signal generator 553. The resistor R12 is connected to the ground reference potential. A connection point between the resistor R11 and the resistor R12 is connected to the terminal 513. The terminal 513 serves as an output terminal for a feedback signal in the feedback signal generation part 51.

Accordingly, the voltage adjustment circuit 554 converts the voltage of a feedback signal output from the individual feedback signal generator 553 into a voltage that can be supported by the driving part 41 and outputs the voltage-converted feedback signal to the terminal 513.

The feedback signal output to the terminal 513 is fed back to the driving part 41. Thus, the individual voltage feedback control loop vFB (two-dot chain line in FIG. 3) and the individual current feedback control loop iFB (dotted line in FIG. 3), which have been described above in the description of the driving part 41, are implemented.

The driving part 41 performs the PWM control described above using the feedback signal.

Thus, even when a rapid change in the load occurs, the output voltage Vout can quickly respond to the change in the load. That is, when the output voltage Vout changes in response to a change in the load, the change in the output voltage Vout is reflected in an individual voltage feedback signal included in the feedback signal. The driving part 41 performs PWM control in such a manner that the output voltage Vout is stabilized, on the basis of the change in the individual voltage feedback signal.

Thus, each of the individual analog controller including the driving part 43 and the feedback signal generation part 53, the individual analog controller including the driving part 42 and the feedback signal generation part 52, the individual analog controller including the driving part 41 and the feedback signal generation part 51 (illustration of these individual analog controllers is omitted), and the individual analog controller including the driving part 44 and the feedback signal generation part 54 can quickly respond to a rapid change in the output voltage Vout and stabilize the output voltage Vout. Furthermore, since each of the individual analog controllers includes an analog electronic circuit, a quicker response and a more stable output voltage Vout can be achieved.

Thus, a change in the output voltage can be detected by the plurality of power conversion circuits 31 to 34 at the same time, driving control using a voltage feedback control loop that can respond most quickly to the detected change in the output voltage can be performed, a quick response to a rapid change in the load can be provided, and a stable power supply can be implemented.

Control by a power conversion circuit that contributes greatly to the output voltage Vout at the point in time practically operates on control of the individual voltage feedback signal. That is, during the period in which the power conversion circuit 31 practically outputs the output voltage Vout, PWM control for stabilizing the output voltage Vout by the power conversion circuit 31 practically operates. Furthermore, during the period in which the power conversion circuit 32 practically outputs the output voltage Vout, PWM control for stabilizing the output voltage Vout by the power conversion circuit 32 practically operates. In a similar manner, during the period in which the power conversion circuit 33 or 34 practically outputs the output voltage Vout, PWM control for stabilizing the output voltage Vout by the power conversion circuit 33 or 34 that practically outputs the output voltage Vout practically operates.

Thus, unless feedback control is performed using an individual current feedback signal as in the present application, power loss in a specific power conversion circuit increases, and the power efficiency as the power supply system apparatus 10 cannot be improved.

However, by performing feedback control using an individual current feedback signal as in the present application, inductor currents in a plurality of power conversion circuits that are connected in parallel to one another (in this embodiment, the power conversion circuit 31 and the power conversion circuit 32) can be averaged. Thus, power loss in the plurality of power conversion circuits can be averaged. As a result, the power supply system apparatus 10 can improve the power efficiency, distribute heat generated by power loss, and improve reliability.

Figure 6A:
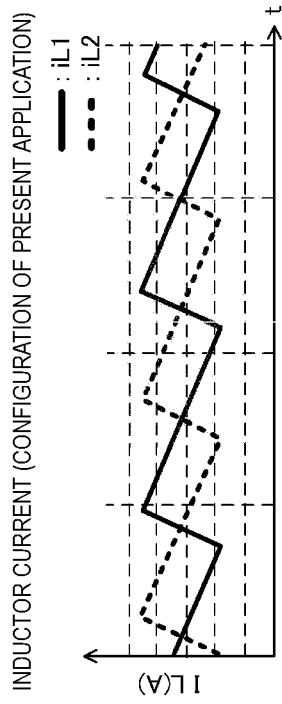
FIGS. 6A and 6B are waveform charts of inductor currents and detection signals of the inductor currents in a comparative configuration.
Figure 6B:
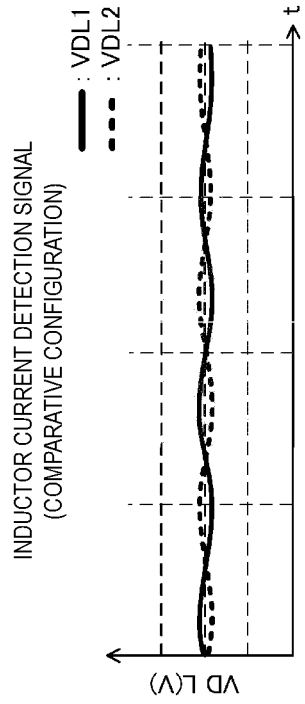
Figure 6C:
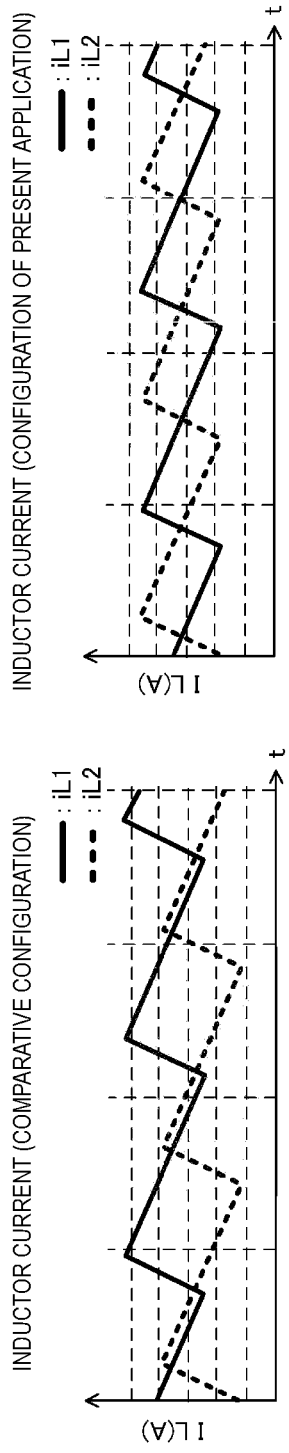
FIGS. 6C and 6D are waveform charts of inductor currents and detection signals of the inductor currents in a configuration according to the present application.
Figure 6D:
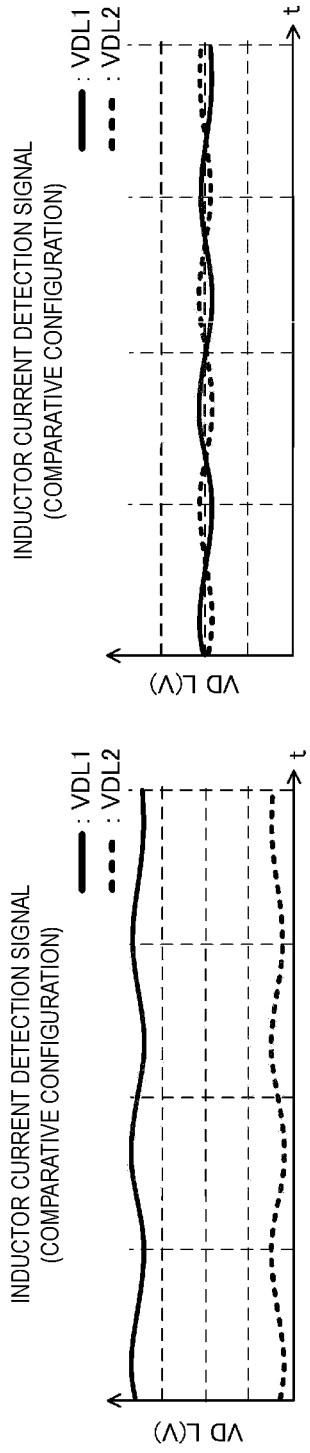

FIGS. 6A and 6B are waveform charts of inductor currents and detection signals of the inductor currents in a comparative configuration, and FIGS. 6C and 6D are waveform charts of inductor currents and detection signals of the inductor currents in a configuration according to the present application. In FIGS. 6A, 6B, 6C, and 6D, cases where the load of the power conversion circuit 31 is larger than the load of the power conversion circuit 32 are illustrated. The comparative configuration does not include the individual current feedback control loop iFB in the configuration according to the present application.

As illustrated in FIGS. 6A, 6B, 6C, and 6D, with the configuration according to the present application, the inductor currents in the plurality of power conversion circuits can be averaged even when the loads of the plurality of power conversion circuits are different.

Since the individual analog controllers each include an analog electronic circuit, the power supply system apparatus 10 can achieve rapid control of averaging the power loss.

That is, the power supply system apparatus 10 can quickly respond to a rapid change in the output voltage Vout and stabilize the output voltage Vout.

Furthermore, with the configuration described above, a detection signal of an inductor current is output based on a predetermined CR time constant. That is, a change in an individual current feedback signal based on a change in a load is detected with a predetermined phase delay with respect to a change in an individual voltage feedback signal. Accordingly, the power supply system apparatus 10 can quickly stabilize the output voltage Vout and then quickly average power loss. Thus, the power supply system apparatus 10 can implement stable power control.

Furthermore, in the power supply system apparatus 10, as described above, an integrated system controller including the individual analog controller and the common controller including the MPU 20 perform control with respect to a change in the load described above and multi-phase control. Thus, the power supply system apparatus 10 can quickly respond to a rapid change in the load and improve the power efficiency, while also achieving an optimal power efficiency for a gradual change in the load.

Second Embodiment

Figure 7:
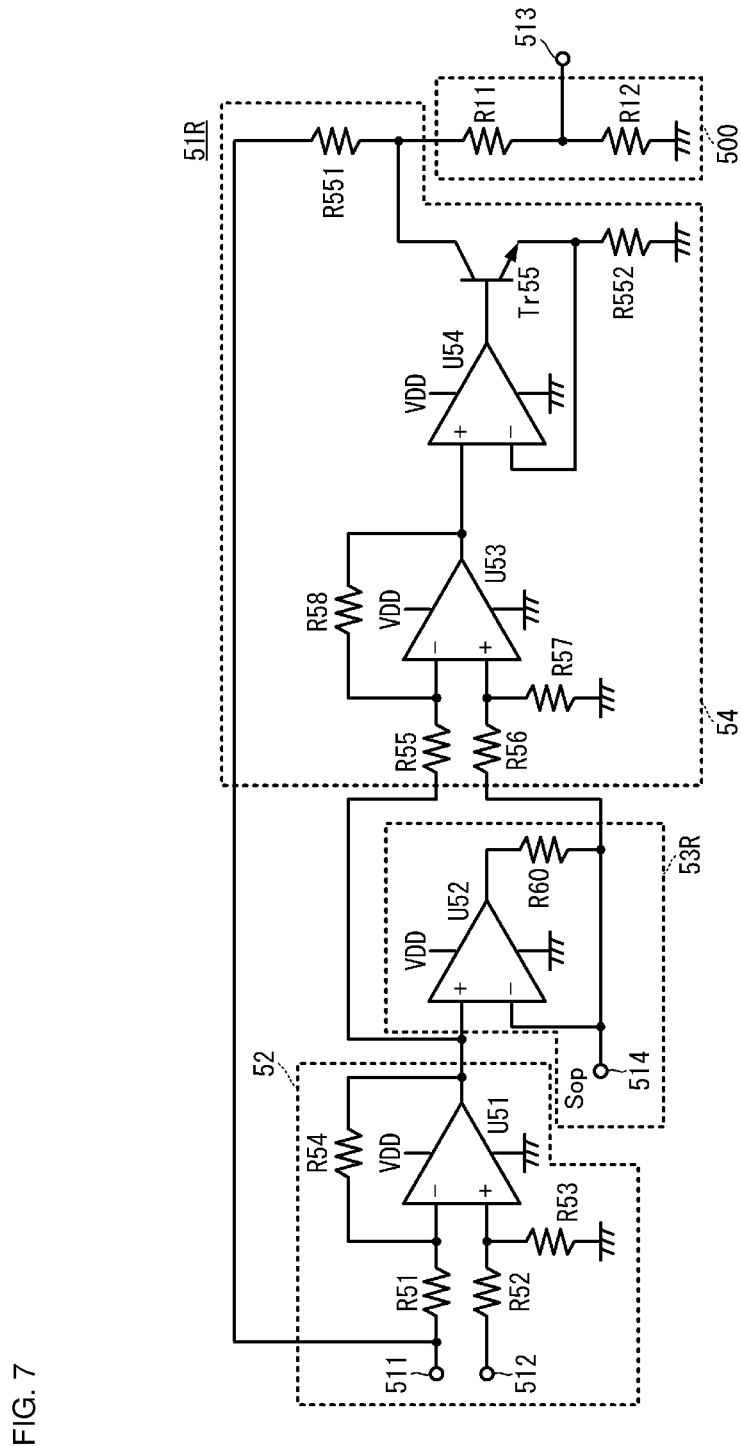
FIG. 7 is a circuit block diagram of a feedback signal generation part in a power supply system apparatus according to a second embodiment.

A power supply system apparatus according to a second embodiment of the present disclosure will be described with reference to a drawing. FIG. 7 is a circuit block diagram of a feedback signal generation part of the power supply system apparatus according to the second embodiment.

As illustrated in FIG. 7, a feedback signal generation part 51R of the power supply system apparatus according to the second embodiment is different from the feedback signal generation part 51 of the power supply system apparatus 10 according to the first embodiment in using a common signal generator 53R. The other configurations of the feedback signal generation part 51R are similar to those of the feedback signal generation part 51, and explanation of the similar configurations will be omitted. In this case, although illustration is omitted, the feedback signal generation part 52R that is connected in parallel to the feedback signal generation part 51R also has a configuration similar to that of the feedback signal generation part 51R.

The common signal generator 53R includes a resistor R60. The resistor R60 is connected between the output terminal and the inverting input terminal of the amplifier U52. With this arrangement, an average value calculation circuit including the amplifier U52 and the resistor R60 is implemented.

The common signal generator 53R defines the average value signal as a common bus signal. As described above, even with the use of the average value signal as a common bus signal, processing similar to that for the maximum value signal described above can be achieved.

What is claimed is:

1. A power supply system apparatus comprising:
a plurality of power conversion circuits each including an inductor, a switching circuit, and an individual analog controller;
a common input terminal to which inputs of the plurality of power conversion circuits are connected in parallel, the common input terminal being connected to an input power supply;
a common output terminal to which outputs of the plurality of power conversion circuits are connected in parallel, the common output terminal being connected to a load; and
a common controller configured to output oscillation control signals to the plurality of power conversion circuits,
wherein the individual analog controller
includes a pulse width modulation control circuit including an analog electronic circuit, and
includes
a voltage feedback signal generator configured to detect an output voltage of the common output terminal and generates a feedback signal, and
a driver configured to drive, based on the feedback signal, a switching element of the switching circuit, and
wherein an integrated system controller including the common controller and the plurality of individual analog controllers
includes a plurality of individual voltage feedback control loops configured to individually control, based on the feedback signals, the pulse width modulation control circuits, while the plurality of power conversion circuits operating in conjunction with each other, and
is configured to supply power to the load, while the plurality of power conversion circuits performing driving control using the individual voltage feedback control loops at the same time in a voltage conversion operation for converting a voltage of the input power supply.

2. The power supply system apparatus according to claim 1, wherein
the voltage feedback signal generator includes
a common node that connects the plurality of power conversion circuits in parallel,
an individual current signal generator configured to generate an individual current signal based on a current of the inductor in the corresponding one of the plurality of power conversion circuits, and
a common signal generator configured to generate a common bus signal flowing to the common node on the basis of the individual current signal for the corresponding one of the plurality of power conversion circuits, and
wherein the voltage feedback signal generator is configured to generate an individual current feedback signal on the basis of a difference between the individual current signal and the common bus signal and outputs the individual current feedback signal as the feedback signal.

3. The power supply system apparatus according to claim 2, further comprising:
inductor current detection circuits configured to detect currents of the inductors,
wherein each of the inductor current detection circuits includes a series circuit including a detecting capacitor and a detecting resistor and connected in parallel to the inductor,
wherein the detecting capacitor and the detecting resistor have a CR time constant that exhibits a predetermined relationship with respect to a specific inductance and a specific AC resistance at a switching frequency of the inductor, and
wherein a voltage across the detecting capacitor is defined as a detection signal of the current of the inductor for generating the individual current signal.

4. The power supply system apparatus according to claim 3, wherein
the individual current signal has a predetermined phase delay with respect to the output voltage of the common output terminal.

5. The power supply system apparatus according to claim 4, wherein
the voltage feedback signal generator is configured to output, as the feedback signal, a signal obtained by combining the individual current feedback signal with the output voltage of the common output terminal.

6. The power supply system apparatus according to claim 2, wherein
the common signal generator configured to generate the common bus signal on the basis of a maximum value of the individual current signals for the plurality of power conversion circuits.

7. The power supply system apparatus according to claim 2, wherein
the common signal generator is configured to generate the common bus signal on the basis of an average value of the individual current signals for the plurality of power conversion circuits.

8. The power supply system apparatus according to claim 1, wherein
the common controller is configured to output the oscillation control signals with different phases of switching frequencies to the plurality of power conversion circuits.

9. The power supply system apparatus according to claim 1, wherein
the switching circuit and the individual analog controller configure a PWM control IC including integrated FETs.

10. The power supply system apparatus according to claim 1, wherein
the common controller includes a programmable microprocessor.

11. The power supply system apparatus according to claim 3, wherein
the common signal generator configured to generate the common bus signal on the basis of a maximum value of the individual current signals for the plurality of power conversion circuits.

12. The power supply system apparatus according to claim 4, wherein
the common signal generator configured to generate the common bus signal on the basis of a maximum value of the individual current signals for the plurality of power conversion circuits.

13. The power supply system apparatus according to claim 3, wherein
the common signal generator is configured to generate the common bus signal on the basis of an average value of the individual current signals for the plurality of power conversion circuits.

14. The power supply system apparatus according to claim 4, wherein
the common signal generator is configured to generate the common bus signal on the basis of an average value of the individual current signals for the plurality of power conversion circuits.

15. The power supply system apparatus according to claim 2, wherein
the common controller is configured to output the oscillation control signals with different phases of switching frequencies to the plurality of power conversion circuits.

16. The power supply system apparatus according to claim 3, wherein
the common controller is configured to output the oscillation control signals with different phases of switching frequencies to the plurality of power conversion circuits.

17. The power supply system apparatus according to claim 2, wherein
the switching circuit and the individual analog controller configure a PWM control IC including integrated FETs.

18. The power supply system apparatus according to claim 3, wherein
the switching circuit and the individual analog controller configure a PWM control IC including integrated FETs.

19. The power supply system apparatus according to claim 2, wherein
the common controller includes a programmable microprocessor.

20. The power supply system apparatus according to claim 3, wherein
the common controller includes a programmable microprocessor.

* * * * *